3,538,297
APPARATUS FOR REMOVING DEFECTS FROM SLABS AND BLOOMS OF STEEL AND OTHER METALS
Daniel A. Maniero, Monroeville, and George A. Kemeny and Armin M. Bruning, Franklin Township, Export, Pa., assignors to Westinghouse Electric Corporation, Pittsburgh, Pa., a corporation of Pennsylvania
Continuation of application Ser. No. 439,832, Mar. 15, 1965. This application Apr. 15, 1969, Ser. No. 817,283
Int. Cl. B23k 7/06
U.S. Cl. 219—121                                                15 Claims

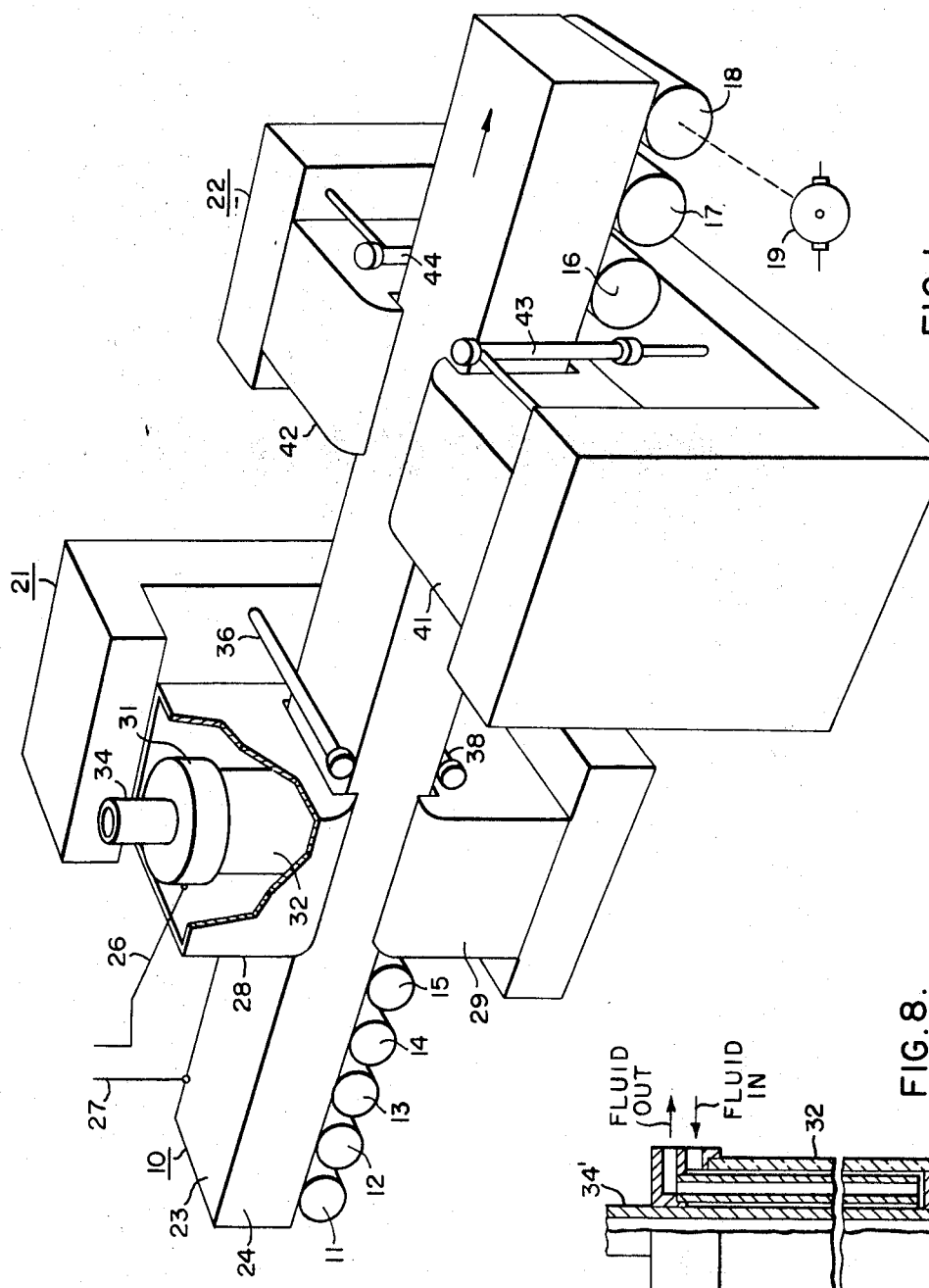
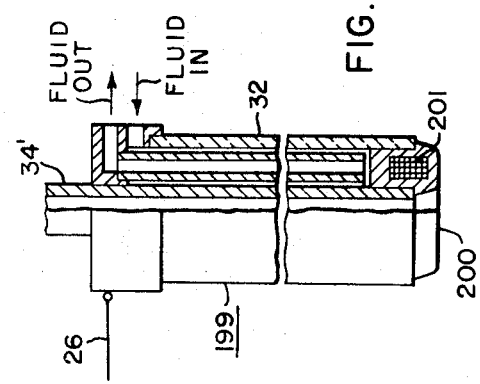
FIG. 1.
FIG. 8.

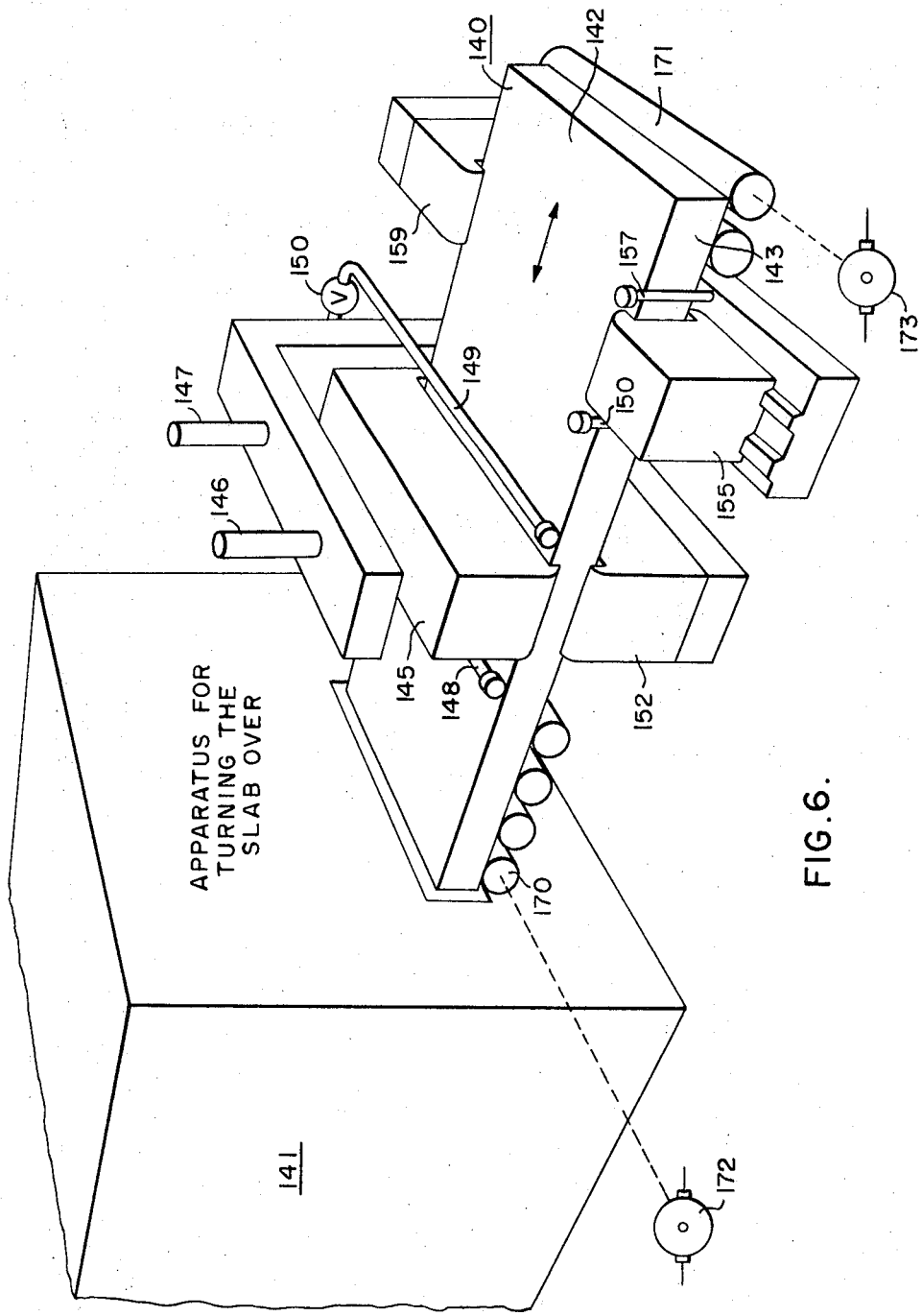

ABSTRACT OF THE DISCLOSURE

One or more electric arcs take place from fluid cooled arcing surfaces at fixed positions along the path of movement of a slab which is to have defects removed therefrom, and magnetic fields generated in the electrodes cause the arcs to move substantially continuously in repetitive paths over the arcing surfaces and over the surfaces of the slab. The repetition rate of movement of the arcs is sufficiently large and the rate of movement of the slab is sufficiently small whereby the arc spot occurs at substantially every point on the slab surface. Additionally, means is provided for quickly cooling successive portions of the surface of the slab after said portions have been heated by the electric arc or arcs. In some embodiments all surfaces of the slab are heated during linear movement of the slab in one direction; in another embodiment, two surfaces of a slab generally rectangular in cross section are heated while the slab moves in one direction, the slab is thereafter turned over and moved back in the opposite direction during which later movement the other two surfaces of the slab are heated.

---

This application is a continuation of application Ser. No. 439,832, filed Mar. 15, 1965, now abandoned.

This invention relates to improvements in a method of and apparatus for removing defects from slabs and blooms of metals such as steel, and more particularly to new and improved apparatus for heating the entire surface of a slab to a predetermined depth by electric arcs taking place to substantially 100% of the slap surface as the slab is moved substantially continuously in relation to the arcs, to thereby treat the entire surface of the slab and remove defects therefrom.

The method generally employed at present in steel mills to eliminate defects in a slab is a method known as hot scarfing. The hot scarfing method is used not only with slabs but with blooms of no particular shape. In the hot scarfing method, the flame from a multiple head torch is brought into contact with all of the surfaces of the slab. The torch uses a fuel gas and oxygen mixture; the surface temperature of the slab is raised to the point where rapid oxidation of the hot surface occurs in the presence of the oxygen stream. The slab is then moved past the torch and the heat generated by the exothermic oxidation reaction is sufficient to sustain the process without further use of the fuel gas. In the process as much as 0.05 inch of metal is removed from all surfaces of the slab with the oxides of iron being blown off the slab surfaces by the high gas exit velocities of the torch heads.

The hot scarfing method is characterized by several disadvantages. One is that sub-surface defects which are not removed during the scarfing must be later identified and burned out by manually operated scarfing torches prior to further working. Another is the considerable loss of metal which results from the scarfing operation. The metal removed up to 0.05 inch thick may correspond to a loss in mill output of as much as 1½%. In addition to the actual value of the metal lost, there are additional costs of carrying away the dross from the scarfing operation and returning it to the furnaces for re-melting.

An additional disadvantage of the hot scarfing method is that large quantities of oxygen are required in scarfing to burn away the surface. An oxygen generating plant must be operated to supply this gas. The oxygen capacity of the equipment, production rate of the blooming mill, and the economic balance of metal loss and handling combine to limit the maximum thickness of metal which can be removed by hot scarfing.

Furthermore, slabs have surface or sub-surface defects, as mentioned hereinbefore, which extend beyond the metal layer removed, which must be identified, and the slabs must be moved to an area where manual scarfing torches are used to remove the defects. The special handling of slabs with defects results in separation of slabs produced for a particular order and requires detailed record keeping and identification to assure that the slabs are included in the correct shipments.

Apparatus for practicing the method of the present invention makes use of arcs from a number of round or elliptical arc electrode heads belonging to nonconsummable water cooled electrodes, the electrodes containing internal stirring coils for producing magnetic fields to substantially continuously move the arcs around the arcing surfaces of the electrodes. An electric arc takes place simultaneously between each electrode and the surface of the slab. The magnetic field produced by the coil rotates the arc on the electrode face and the arc is "dragged" along the slab surface. Heat generated in the slab by radiation from the arc, by resistance heating at the point of contact of the arc, and heat of convection of hot gases in the vicinity of the arc, results in melting the slab to a depth determined by the material of the slab, by arc current and speed of rotation, and slab temperature and speed of movement. Cracks and other defects in the slab surface are healed as the metal is melted by the arc and then cooled by spray from fluid manifolds. Solid and gaseous impurities are floated to the slab surface in the molten zone where they either escape to atmosphere or else are retained for a later removal. In one embodiment of apparatus for practicing the invention, during the surface heating and cooling oxidation of the surface is prevented by providing a reducing gas or inert gas atmosphere.

In further summary in one embodiment of apparatus for practicing the method of the invention a plurality of electrodes are disposed adjacent the upper surface of the slab, an additional plurality of electrodes are disposed adjacent the lower surface of the slab, with smaller numbers of electrodes disposed on each side of the slab so that the entire slab surface is heated as the slab moves along. Disposed near the arc electrodes are fluid spray devices for quickly cooling portions of the surface after movement of the slab has moved any heated portion away from the vicinity of the arc electrodes. In another embodiment, electrodes on the top and one side of the slab heat these surfaces as the slab moves in one direction. whereafter the slab ismoved to a device for turning the slab over, and the slab is thereafter moved past the electrodes in the opposite direction whereupon the former bottom surface and the other side surface are heated, spray cooling devices being disposed on both sides of the electrode assembly.

Accordingly, one object of the invention is to provide a new and improved method for removing defects from slabs and blooms of steel and other metals.

Another object is to provide new and improved apparatus for removing defects from slabs and blooms of steel and other metals.

A further object is to provide new and improved apparatus employing nonconsumable arc electrodes for remelting the surface of a slab or bloom of steel or other metal to a predetermined depth to eliminate defects therefrom, and employing means to quickly cool the remelted surface to avoid oxidation thereof.

Still a further object is to provide new and improved bloom and slab remelt arc heater apparatus.

An additional object is to provide new and improved apparatus for heating the surface of a slab or bloom to a predetermined depth.

These and other objects will become more clearly apparent after a study of the following specification, when read in connection with the accompanying drawings, in which:

FIG. 1 is a view in perspective of apparatus for treating the top, bottom and both sides of the slab in a single movement and utilizing four large electrodes which may be generally cylindrical for heating each of the four surfaces of the slab;

Figure 2:
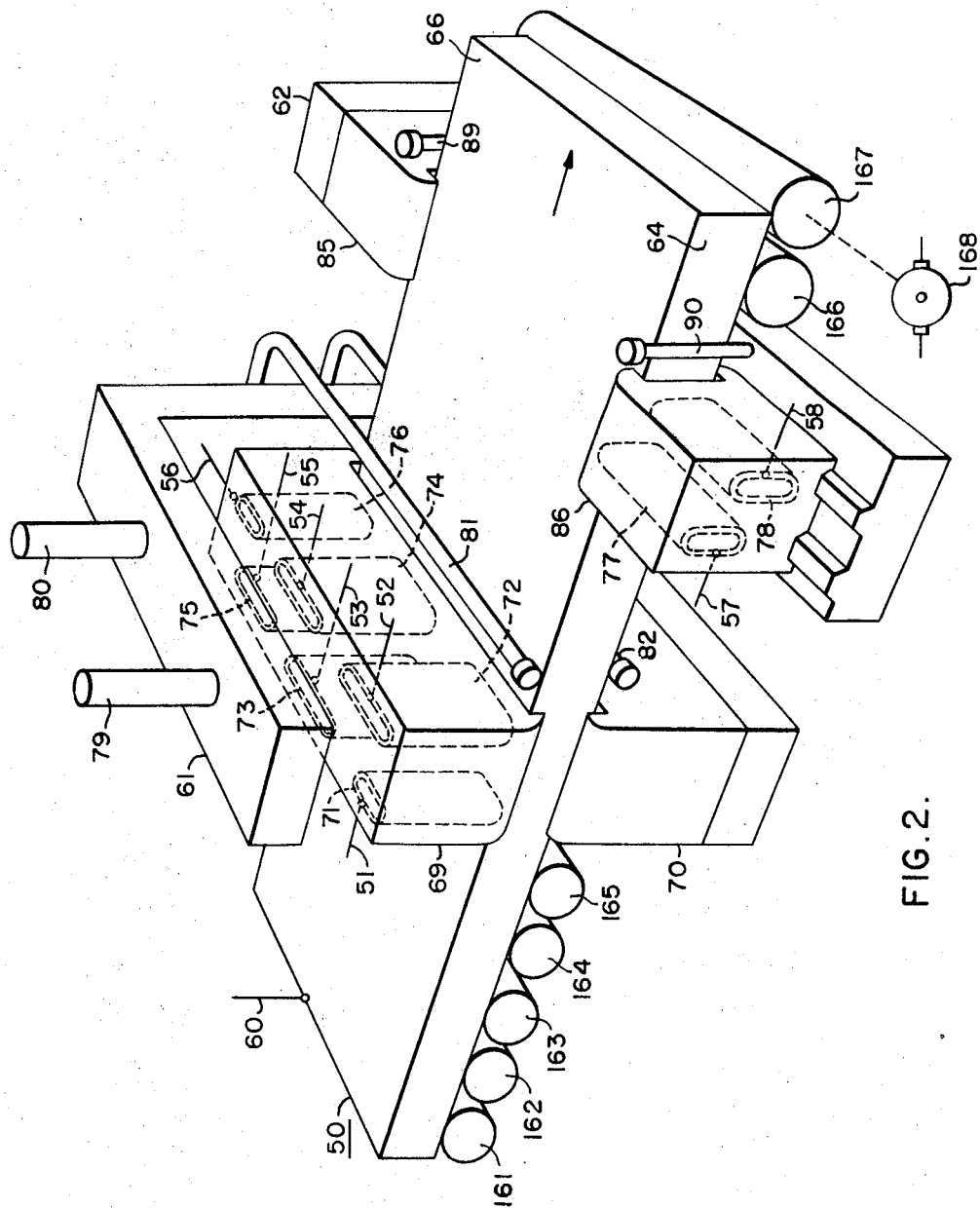
FIG. 2 is a view of a second and preferred embodiment of apparatus, in which a number of electrodes spaced in predetermined patterns are used for each surface of a wide slab during the slab remelt operation.
Figure 4:
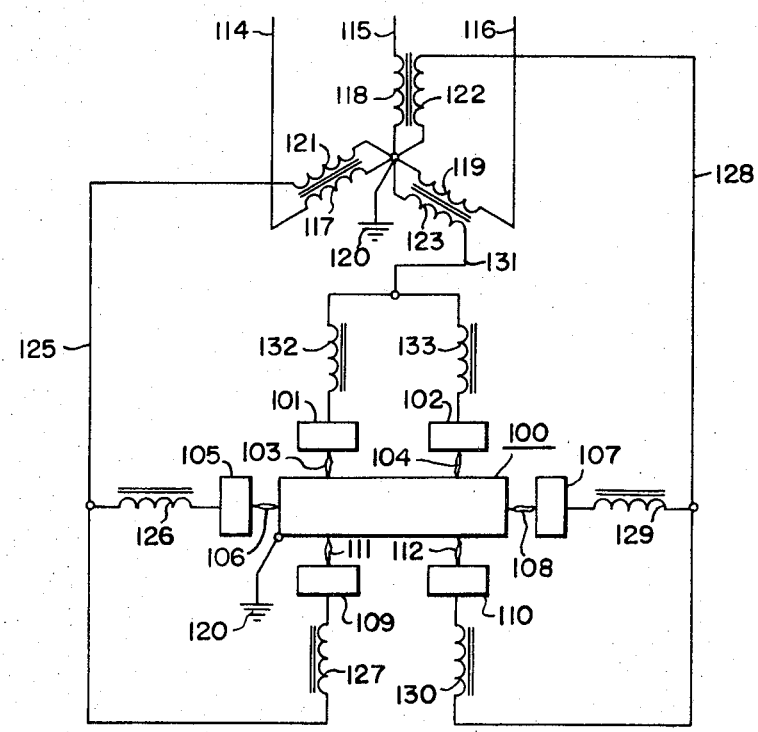
Figure 5A:
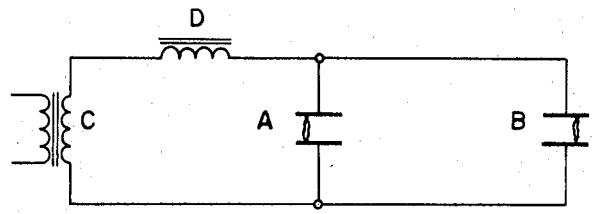
Figure 5B:
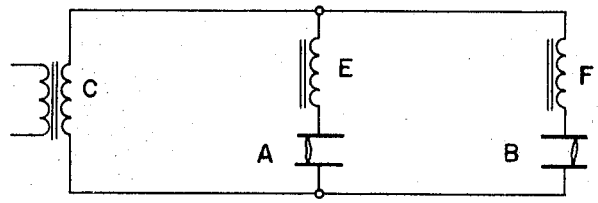
Figure 7:
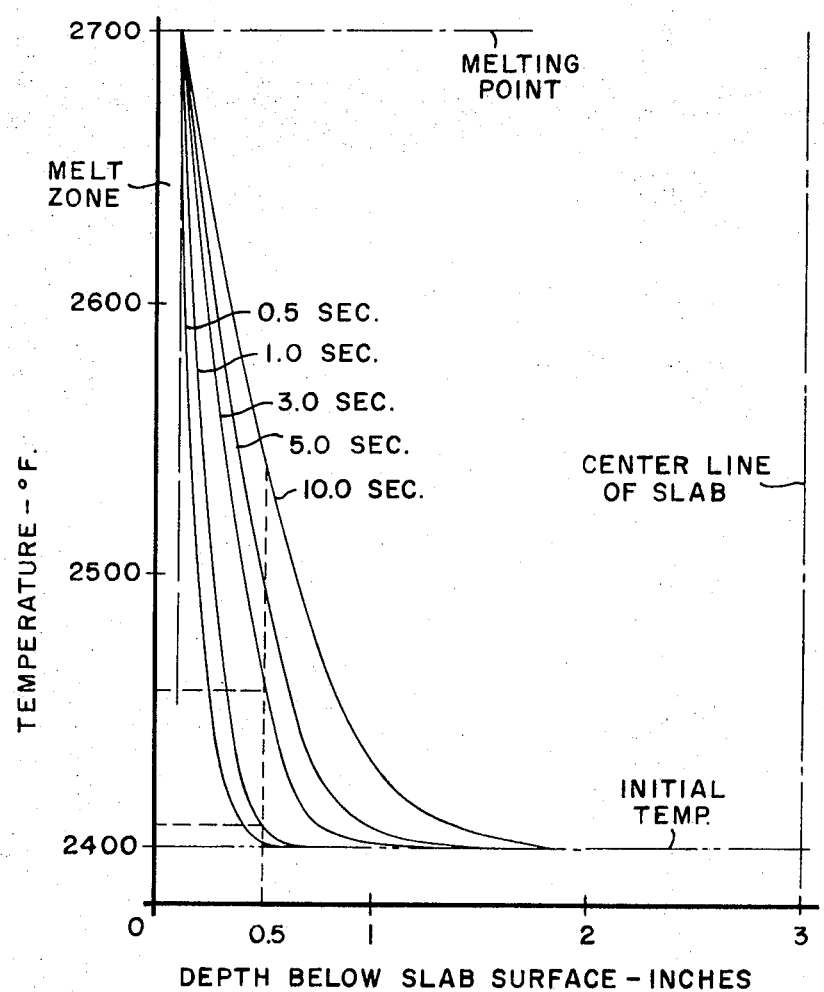

FIG. 4 is an electrical circuit diagram of a simplified version of the apparatus of FIG. 2, in which two electrodes with overlapping patterns of arc movement are used for the top of the slab, two similar electrodes with overlapping patterns of arc movement are used for the bottom of the slab, and one electrode is used for each side of the slab, all of these electrodes being fed from one three-phase high voltage transformer source;

FIGS. 5A and 5B are schematic electrical circuit diagrams illustrating the effect of an inductor or lack thereof in series with each pair of cooperating arc electrodes;

FIG. 6 is a perspective view of apparatus according to a fourth embodiment of the invention in which the steel slab is turned over to complete the process of heating all surfaces of the slab;

FIG. 7 is a graph illustrating the operation of the apparatus of FIGS. 1, 2 and 6; and FIG. 8 is an elevational view partially in section of a non-consumable electrode.

Referring now to the drawings for a more detailed understanding of the invention, in which like reference numerals are used throughout to designate like parts, and in particular to FIG. 1 thereof, a slab to be heat treated is generally designated 10, is mounted upon rollers 11, 12, 13, 14 and 15 on the one hand, and 16, 17, and 18 on the other, having disposed therebetween two arc electrode assemblies or C-frames generally designated 21 and 22, the electrode assembly 21 being arranged for the purpose of heating the top 23 and bottom of the slab, and the electrode assembly 22 being constructed and arranged to heat the two sides of the slab, one of these sides being shown at 24. In accordance with conventional practice, motors may be disposed at spaced intervals along the path of travel of the slab 10 to apply turning forces to certain of the rollers, for example motor 19 and roller 18, certain other rollers or groups of rollers intermediate the driven rollers being journaled for free rotation while supporting the slab in its translatory movement.

The electrode assembly generally designated 21 is seen to include an upper housing, shroud or muffler 28 and a lower housing or shroud 29. Disposed within the upper shroud 28 there is seen an upper non-consumable electrode 31. It will be understood that the lower housing or shroud 29 has a similar electrode, not shown, disposed therein. The electrode 31 is of the nonconsumable type, that is, it includes a water cooled electrode face member with a coil disposed adjacent thereto or within the electrode, the coil being constructed and arranged to set up a magnetic field of sufficient magnitude transverse to the current path of the arc between the electrode and the slab to provide that the arc moves substantially continuously around the electrode face member at a predetermed speed, in accordance with the current through the arc and the construction including the dimensions of the electrode, so that substantially no sublimination of electrode material from the electrode face member occurs, and no burn through as a result of the intensely hot arc spot occurs.

The factors which must be considered in manufacturing and constructing a non-consumable electrode which will withstand the most severe operating conditions, including very high current conditions of a substantially continual nature, arc reheating apparatus in the instant case, are set forth fully in the copending application of A. M. Bruning for Electric Arc Furnace and Non-Consumable Electrode for Use Therein," Ser. No. 407,332, filed Oct. 29, 1964, and assigned to the assignee of the instant invention.

Disposed within the cylindrical electrode 31 and spaced therefrom is a pipe 34 for bringing an inert gas and exhausting the gas on the heated slab in the area of the arc. The gas brought in by pipe 34 may also be chosen to establish a reducing atmosphere at the heated slab. The slab 10 moves generally from left to right in the figure and accordingly there is provided a spray tube water manifold, or spray pipe 36 for spraying cold water or other fluid on successive areas of the hot surface of the slab substantially immediately after these areas of the surface of the slab move out from under the shroud. It will be understood that the pipe 36 has a plurality of spaced apertures along the length thereof so that cooling fluid may be substantially directly applied to all surface portions of the top 23 of the slab 10 along any given lateral path.

It will be understood that means symbolized by lead 26 is provided for bringing electrical current to the electrode 31; means is provided for connecting the terminal of opposite polarity of the source to the slab, symbolized by lead 27. In actual practice, certain rollers of conductive material may conduct current to the slab, the rollers having spaced teeth scattered over the surface thereof to bite into the slab and make good electrical contact. Also, spring biased roller electrodes on the side of the slab can be employed.

Means is also provided for bringing a cooling fluid to the electrode 31 and conducting fluid therefrom after the fluid has passed around the electrode face member and possibly other parts of the electrode to conduct heat therefrom. The tubular electrode supporting structure 32 may itself be at least partially conductive to conduct electric current to a conductive electrode face member.

Within the housing, shroud or muffler 29 beneath the slab 10, it will be understood that there is disposed an energized electric arc electrode which may be substantially similar to electrode 31, and which may have a pipe corresponding to the pipe 34 for bringing an inert or reducing gas to the area of the slab surface the arc impinges on. The lower shroud 29 has the fluid pipe or manifold 38 disposed in a manner to spray a cooling fluid on the bottom of the slab as the slab passes by.

Spaced a predetermined distance from the electrode assembly 21, depending upon the speed of the travel of the slab 10 and other factors such as the temperature of the slab, the material thereof, and the depth to which the slab is to be heated, is the second aforementioned electrode assembly 22 mounted on a C-frame and having shrouds 41 and 42 each containing an electrode, not shown, having a diameter at least as great as the height of a side of the slab, which it is understood are suitably connected to a source of potential to produce arcs to the slab 10; the electrodes of shrouds 41 and 42 also contain a pipe or pipes, not shown, for bringing an inert or reducing gas to the area of the arc and releasing it. Disposed adjacent the exit side of the shroud 41 is a spray pipe or manifold 43; disposed adjacent the exit side of shroud 42 is a spray pipe or manifold 44, for spraying the two sides of the slab to quickly cool successive areas of the same after the areas have passed through the heating areas of the arc electrodes in shrouds 41 and 42.

In the operation of the apparatus of FIG. 1, as previously stated an electric arc is struck between each electrode and the surface of the slab. In FIG. 1 the slab is assumed to be of a relatively small width and a relatively small height. For example, the dimensions of a bloom or slab frequently encountered in practice is 7¼ inches by 8¾ inches. Assuming for the purpose of discussion that the top of the slab is 8¾ inches in width, then the diameter of the arcing surface of the electrode 31 would be made approximately 8¾ inches in width, or slightly over, so that the arc traveling around the arcing surface in response to the aforementioned magnetic field continuously moves back and forth across the entire upper surface of the slab. It will be apparent that even though the slab may be moving a speed of several inches per second, the arc of the electrode 31 may be made to roate at a speed of, for example, 3,000 revolutions per second, this being a speed which is easily obtained in practice, so that assuming that the slab moves 3 inches per second and the arc moves 3,000 revolutions per second it will be seen that the arc will traverse the slab approximately 2,000 times per inch, or will make approximately 1,000 return trips across the slab per inch, so that for all practical purposes every spot on the slab comes in direct contact with the arc from electrode 31. The electrode in shroud 29 has the same shape, in other words, as a diameter at least as great as the width of the bottom of the slab, and the arc therefrom can rotate at the same speed.

The electrodes in shrouds 41 and 42 have diameters substantially corresponding to the height of the sides of the slab, or slightly greater, and the arcs therefrom can rotate at the same speed in accordance with the current in the arc and the strength in the magnetic field. Formulas for calculating the speed of the arc from the field strength and the arc current are set forth in the aforementioned copending patent application of A. M. Bruning. It will be readily seen that other factors may enter into the desired speed of travel of the slab, and the desired speed of roation of the arc. For example, the depth to which the slab is to be heated is a factor; if it is desired to heat the slab to a greater depth, then the speed of rotation of the arcs can be increased, or the current in the arcs can be increased.

Formulas for relating the speed of the movement of the arc, speed of movement of the slab, arc current, and material, to the required heat flux for melting the slab to a predetermined depth will be set forth more fully hereinafter.

Roller 11 may also be dirven by a motor, not shown.

Particular reference is made now to FIG. 2 where a second and preferred embodiment of apparatus for practicing our invention is shown. A slab generally designated 50, considerably wider than the slab 10 of FIG. 1, is shown as being moved by rollers 161 to 165 at one end thereof, and rollers 166 and 167 at the other end thereof, between two electrode assemblies 61 and 62. In the electrode assembly 61 an upper shroud 69 has electrodes 71, 72, 73, 74, 75 and 76 disposed therein having leads 51, 52, 53, 54, 55 and 56 respectively, and having dimensions approximately as shown. A lower shroud 70, it will be understood, has the same number of electrodes of similar dimensions spaced in the same manner positioned therein, with means not shown for convenience of illustration, for bringing electrical current to the electrodes to produce arcs from the electrodes to the bottom of slab 50. Pipes 79 and 80 bring an inert gas to the shroud 69, the gas being exhausted or freed in the area adjacent the arcing surface of the slab. The shrouds 69 and 70 have fluid spray pipes or manifolds 81 and 82 respectively on the exit sides thereof for spraying the upper and lower surfaces of the slab with a cooling fluid. It will be understood that pipes, not shown for convenience of illustration, also bring an inert gas to the electrodes of the lower shroud 70, this gas also being freed near the arcing surface of the slab.

Rollers 161–167 move the slab; roller 167 is shown as being driven by motor 168. Roller 161 may also be driven by a motor, not shown for convenience of illustration.

It will be understood that if desired additional rollers, not shown for convenience of illustration, may be disposed between electrode assembly 61 and electrode assembly 62.

It is seen in FIG. 2 that any portion of the slab 50 after moving past the area adjacent the fluid cooling pipes 81 and 82 moves adjacent the aforementioned second electrode assembly 62, which has shrouds 85 and 86 disposed adjacent the sides of the slab 50, each of the shrouds containing a pair of electrodes, the electrodes of shround 86 being shown at 77 and 78 with leads 57 and 58 respectively. Disposed adjacent the exit sides of the shrouds 85 and 86 are a pair of fluid spray pipes or manifolds 89 and 90 for spraying the sides of the slab with a cooling fluid after any given portion of the slab has passed through the heating area of the shrouds. It will be understood that the shroud 85 has a pair of electrodes, not shown for convenience of illustration, similar to electrodes 77 and 78, and shroud 85 has means, not shown, for bringing potentials to the electrodes therein to form arcs to the side surface of the slab 50. It will further be understood that both shrouds 85 and 86 have pipes or other means, not shown for convenience of illustration, for bringing an inert gas into the shround and releasing the gas at the area or areas where the arcs take place to the surface of the slab or bloom.

Figure 3A:
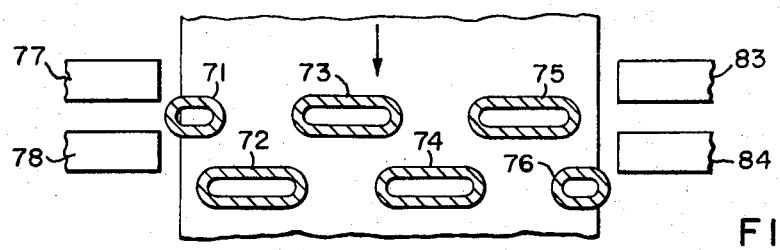
FIGS. 3A and 3B are views of the electrode arrangement of FIG. 2.

Particular reference is made now to FIG. 3A, which is a composite view in which the upper electrodes of assembly 61 are shown in cross section, and the electrodes of both shrouds 85 and 86 of the second electrode assembly 62 are shown generally in plan. The purpose of the composite view of FIG. 3A is to more clearly illustrate that the six electrodes 71 to 76 are so disposed that any point on the top surface of the slab passes through the arc of at least one of the six electrodes as the slab 50 moves with respect to the electrode assembly and the arcs rotate. The electrodes of the assembly 62 are seen as spaced along the path of movement, the electrodes of shround 86 being shown at 77 and 78, and in FIG. 3A electrodes 83 and 84 of shround 85 are also shown.

Figure 3B:
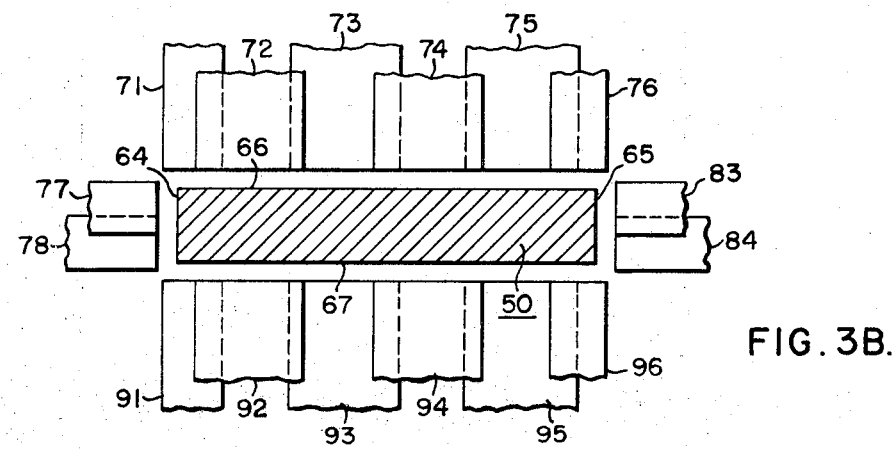

In FIG. 3B, to which particular attention is directed, the slab 50 is shown in relationship to all of the electrodes of both electrode assemblies 61 and 62. In FIG. 3B, the aforementioned electrodes on the bottom shroud 70 are shown at 91 to 96 inclusive. From FIG. 3B, it is seen that the side electrodes 77 and 78 overlap each other in a vertical direction, so that no portion of the side 64 of the slab can pass without having an arc traverse thereover, and electrodes 83 and 84 of shroud 85 are so placed that no portion of the side 65 of the slab can pass the electrodes without having the arc traverse the area of that portion of the side of the slab. In a like manner the aforementioned electrodes 71 to 76 are as aforementioned so placed with overlapping paths of arc movement that the top 66 of the slab has every spot thereon traversed by an arc, depending upon aforementioned factors of speed of rotation of the arcs, and the speed of movement of the slab. In like manner the bottom 67 of the slab has every point thereon subject to contact with the arcs from one of the aforementioned electrodes 91 to 96.

The apparatus of FIG. 2, by providing six arcs to cover or care for the entire upper and lower surfaces of the slab 50, permits a proportionally larger or more frequent contact of the arc with any given area of the slab, and more heat can be obtained in this fashion for treating a wider slab, or treating a given slab to a greater depth, or melting the surface of the slab in a shorter time.

Particular reference is made now to FIG. 4 wherein an electrical circuit according to a third embodiment of the invention is shown. In the apparatus of FIG. 4 two electrodes 101 and 102 produce arcs 103 and 104 respectively to the top surface of a slab generally designated 100. At the sides of the slab 100 one electrode has a sufficiently large diameter to cover an entire side, one of these side electrodes being shown at 105, producing an arc 106, the other electrode being shown at 107 producing an arc 108. At the bottom of the slab electrodes 109 and 110 produce arcs 111 and 112 respectively.

In FIG. 4 the six electrodes 101, 102, 105, 107, 109 and 110 are connected to a three-phase source of supply. A three-phase transformer has its primaries 117, 118 and 119 Y-connected with the junction between primaries connected to ground 120, and leads 114, 115, 116 connected to a suitable source of three phase alternating current potential. Secondaries 121, 122 and 123 are also Y-connected with the junction grounded at 120, and it is seen that the slab 100 is also electrically connected to ground 120. Secondary 121 is connected by way of lead 125 and inductor 126 to the aforementioned electrode 105, and lead 125 is also connected by way of inductor 127 to the aforementioned electrode 109. The aforementioned secondary 122 is connected by lead 128 and inductor 129 to electrode 107, and lead 128 is also connected by inductor 130 to electrode 110. The aforementioned secondary 123 is connected by lead 131 and inductor 132 to electrode 101, and the lead 131 is also connected by way of inductor 133 to electrode 102 completing the electrical circuit for forming the six arcs to the slab 100.

Particular reference is made now to FIGS. 5A and 5B. In FIG. 5A two pairs of electrodes A and B are shown connected across a single secondary, by way of a choke or inductor D which carries the current of both arcs. Let it be assumed for purposes of illustration that secondary C supplies 2,000 volts and that it requires a voltage of 1,000 volts to start an arc at electrodes B. Assume further that an arc is taking place at the pair of electrodes A. The voltage drop across the electrodes A is the same as that across electrodes B and is so small that the necessary voltage will never be built up across the electrode B to cause an arc to start. Assume now that circuit is connected as shown in FIG. 5B, in which electrodes A and B have individual inductors or choke coils E and F connecting them to the secondary C. If the arc starts at A before it does at B, even though a voltage, for example, only 500 volts exists across the arc A, an additional voltage drop of 1,500 volts may exit across the series-connected choke. This is on the assumption that secondary C supplies a voltage of 2,000 volts. Since no current is flowing in the choke or inductor F, no voltage drop occurs thereacross, and the entire 2,000 volts is developed across the pair of electrodes B sufficient to start the arc. Such an arrangement of an individual inductor in series with each pair of electrodes is accordingly desirable and possibly necessary when two pairs of electrodes are fed from the same phase of a three-phase alternating current source, such for example as used in the circuit of FIG. 4.

If desired, ground 120 may be omitted from both transformer and slab, with the slab providing a conductive neutral current path between phases.

The secondaries could also be delta connected, without requiring any electrical connection to the slab.

Particular reference is made now to FIG. 7, where the graphs illustrate the relationship between the average temperature of the slab or bloom, and the depth to which the slab is heated beneath the surface for a number different "dwell times" or heating times or passage times, it being assumed that the power in the arcs remains substantially constant.

The family of curves of FIG. 7 shows the different temperatures to which the slab is heated at any given depth as the time employed to melt the surface of the slab to a depth of 0.1 inch is varied. Assuming for the purposes of discussion an initial slab temperature of 2400° F., and that the slab melts at 2700° F., if the time used to melt the surface of the slab to a depth of 0.1 inch is one second, it is seen from the curves that a point in the slab 0.5 inch from the surface or 0.5 inch deep is heated to 2,410°, whereas in three seconds the same point 0.5 inch deep is heated to 2,460°.

The temperature of the point, and those of other points of other depths, can also be obtained for other heating times from the curves.

Since the longer the time required to melt to 0.1 inch, for any given depth in the slab, the greater the temperature the slab at that depth is heated to, it is apparent that additional heat energy is required at the slower speed. From the curves of FIG. 7 it is seen that the integrated area under the three second curve is greater than the integrated area under the one second curve. This integrated area represents heat used in heating the slab in addition to the heat required to melt the surface to a depth of 0.1 inch. Since heat energy used in heating the core of the slab serves no useful purpose, it is seen that the longer time of 3 seconds represents decreased efficiency.

From the one second curve, it is seen that after a period of one second the temperature distribution in the remainder of the slab is such that at a depth of approximately 0.25 inch from the surface, the metal temperature has risen to 2,500° F.

The curves of FIG. 7 are useful in calculating the additional heat required to balance loss to the core of the slab in the following somewhat simplified calculations of an exemplary condition which might be met in practice, where a slab size of 6' x 1' is assumed, an initial slab temperature of 2,400° F. is assumed, and it is assumed that the material of the slab melts at 2,700° F.:

Specific heat required to raise the metal temperature from 2,200° F. to 2,700° F. $= .11 \frac{\text{B.t.u.}}{\text{lb.}^\circ \text{F.}} \times 300° \text{F.} = 33 \frac{\text{B.t.u.}}{\text{lb.}}$ Heat of fusion to melt metal at 2,700° F. $= 117 \frac{\text{B.t.u.}}{\text{lb.}}$ Assume melting to a depth of 0.1 inch: (and a metal weight of 0.284 lb./in.³)

$$0.1 \text{ in.} \times \frac{144 \text{ in.}^2}{\text{ft.}^2} \times .284 \frac{\text{lb.}}{\text{in.}^3} = 4.1 \frac{\text{lbs.}}{\text{ft.}^2}$$

The heat flux required for melting is:

$$117 \times 4.1 = 480 \frac{\text{B.t.u.}}{\text{ft.}^2}$$

$$33 \times 4.1 = 135 \frac{\text{B.t.u.}}{\text{ft.}^2}$$

$$\text{Total} = 615 \frac{\text{B.t.u.}}{\text{ft.}^2}$$

The additional heat required to balance loss to core of slab, where $q$ is the energy per unit area, obtained from the curve of FIG. 7 by integrating the area under the curve:

$$q\ 1\ \text{sec.} = 192\ \frac{\text{B.t.u.}}{\text{ft.}^2} \qquad q\ 3\ \text{sec.} = 338\ \frac{\text{B.t.u.}}{\text{ft.}^2}$$

$$q\ \text{melt} = 615\ \frac{\text{B.t.u.}}{\text{ft.}^2} \qquad q\ \text{melt} = 615\ \frac{\text{B.t.u.}}{\text{ft.}^2}$$

$$807\ \frac{\text{B.t.u.}}{\text{ft.}^2} \qquad\qquad 953\ \frac{\text{B.t.u.}}{\text{ft.}^2}$$

For the slab, size 6′ x 1′

$$1\ \text{sec.)}\ 807\ \frac{\text{B.t.u.}}{\text{ft.}} \times 14\ \frac{\text{ft.}^2}{\text{ft.}} = 11,300\ \frac{\text{B.t.u.}}{\text{ft. (linear)}}$$

$$3\ \text{sec.)}\ 953\ \frac{\text{B.t.u.}}{\text{ft.}} \times 14\ \frac{\text{ft.}^2}{\text{ft.}} = 13,340\ \frac{\text{B.t.u.}}{\text{ft. (linear)}}$$

From power equivalent tables such as those found in a handbook for electrical engineers, it is found that one B.t.u. is approximately the equivalent of one kilowatt. Assuming slab speeds of 100 feet per minute and 33.3 feet per minute, by way of examples.

Power into slab:

$$11,300\ \frac{\text{B.t.u.}}{\text{ft.}} + 100\ \frac{\text{min.}}{\text{ft.}} = 1.13 \times 10^6\ \frac{\text{B.t.u.}}{\text{min.}}$$

$$= 19.8\ \text{megawatts}$$

$$13,340\ \frac{\text{B.t.u.}}{\text{ft.}} + 33.3\ \frac{\text{min.}}{\text{ft.}} = 0.444 \times 10^6\ \frac{\text{B.t.u.}}{\text{min.}}$$

$$= 7.8\ \text{megawatts}$$

Assuming an efficiency of 50 percent, the powers required are 39.6 megawatts and 15.6 megawatts.

Assuming use factors of 20 percent and 40 percent for the 100 ft./min. and 33.3 ft./min. speeds.

$$39.6\ \text{mw.} \times .2\ \frac{\text{hr.}}{\text{hr.}} = 7.92\ \frac{\text{megawatt hours}}{\text{hr.}}$$

$$15.6\ \text{mw.} \times .4\ \frac{\text{hr.}}{\text{hr.}} = 6.24\ \frac{\text{megawatt hours}}{\text{hr.}}$$

Particular reference is made now to FIG. 6, where a fourth embodiment of the invention is shown which is particularly suitable for use where difficulty is encountered, and melting the bottom surface of the bloom or slab results in loss of molten metal before it can be solidified. In the embodiment of FIG. 6, the top and one side of the slab 140 are treated as the slab moves in one direction, for example, from the right to left in the figure. The slab thereafter passes into apparatus which may be of conventional design and which is shown in block form at 141 for turning the slab over, and the slab is thereafter passed again past the electrodes where the other wide surface and the other side are treated as the slab moves in the opposite direction, for example, from left to right in the figure. For the purposes of describing the embodiment of FIG. 6, the top surface of the slab is designated 142, and the side surface first treated is designated 143. The shroud 145 has a plurality of energized electrodes, not shown for convenience of illustration, disposed therein, with pipes 146 and 147 for bringing an inert or reducing gas to the arcing surface of the slab. It is seen that shroud 145 has two spray pipes or manifolds on the two sides thereof, these being shown at 148 and 149, each of the spray pipes having a valve therein, the valve for pipe 149 being shown at 150. As the slab 140 is moving in the left-hand direction, the valve in pipe 148 is opened so that spray coming out of the spray pipe or manifold 148 cools successive portions of the slab surface which have passed adjacent the electrodes within the shroud 145. On the other hand, after the slab has been turned over in apparatus 141, the valve in pipe 148 is turned off, and the valve 150 to manifold 149 is opened so that spray pipe or manifold 149 sprays the upper or adjacent surface of the slab after said last named surface passes adjacent the electrodes within the shroud. It will be understood that the lower housing 152 contains no electrodes in the embodiment of FIG. 6. The lower housing 152 may if desired be replaced by rollers so that an unbroken series of rollers supports the slab 140. As previously stated some of the rollers are free to rotate, while other rollers are driven, the driven rollers being disposed at spaced intervals along the length of the slab, two driven rollers being designated 170 and 171 with reversible drive motors 172 and 173 respectively.

The electrode or electrodes for treating the side 143 of the slab, as the slab moves from a right to left direction are disposed within the shroud 155, which has spray pipes 156 and 157 disposed on the sides thereof, respectively, it being understood that the spray pipes or manifolds 156 and 157 have valves, not shown, individual thereto so that successive portions of the surface of the side of the slab can be sprayed with a cooling fluid substantially immediately after they leave the electrode area, depending upon which direction the slab is moving. It will further be understood that the housing 159 contains no electrode in the embodiment of FIG. 6. Means, not shown, is provided for bringing an inert gas into the shroud 155 and permitting the inert gas to escape near the arcing surface of the slab.

Particular reference is made now to FIG. 8, where a simplified cylindrical non-consumable electrode 199 is shown, partially in elevation and partially in cross-section, the details of the non-consumable electrode constituting no part of the present invention, the annular arcing surface being shown at 200, the field coil at 201.

In FIG. 1, the upper and lower electrodes may be connected to opposite terminals of a source of potential, the slab providing a neutral current path between the electrodes. In like manner, the side electrodes may be connected to terminals of opposite polarity of a source, the slab being neutral but providing a current path between electrodes.

There have been provided then a number of embodiments of apparatus suitable for practicing the method of our invention, which is to pass the surfaces of a slab or bloom past an arc or arcs where the surfaces are simultaneously or sequentially heated to a predetermined depth to remove defects therefrom, and the surfaces are promptly cooled after the heat treatment thereof by the arcs.

The term "inert gas" as employed in the claims appended hereto includes reducing gases and non-oxidizing gases.

The term "slab" as used in the claims appended hereto includes blooms of irregular shapes.

Whereas we have shown and described apparatus for practicing the method of our invention according to a number of embodiments thereof it will be understood that changes may be made and equivalents substituted without departing from the spirit and scope of the invention.

We claim as our invention:

1. Apparatus for removing defects from a multisurface slab of metal comprising in combination, means for moving the slab of metal in a predetermined linear path at a predetermined speed, first electrode means including at least one electrode having an annular fluid cooled electrode face member forming an arcing surface, second electrode means including at least one additional electrode having an annular fluid cooled electrode face member forming an arcing surface, the first and second electrode means being mounted at predetermined fixed positions along said path adjacent the same slab surface, and electrical circuit means connected to the electrodes for producing arcs from the electrode face members to the same surface of the slab, the arcs extending in a direction substantially parallel to the axis of the electrode, each of the electrode face members forming a fluid cooled arcing surface of substantial area with the arcing surface generally parallel to and spaced from the slab surface and magnetic field coil means mounted in the electrode for generating a magnetic field with at least a strong component extending substantially radially in a transverse direction across the arcing surface in substantially uniform strength around the entire periphery thereof and exerting a force on the arc for causing the arc from the arcing surface to move thereover and therearound substantially continuously in a repetitious substantially annular path and to thereby follow a similar annular path on the adjacent slab surface, the first and second electrode means being mounted at selected lateral positions whereby the first electrode means produces at least one arc path extending over a predetermined portion of the lateral dimension of the slab surface and the second electrode means produces at least one arc path which extends over the remaining portion of the lateral dimension of the slab surface, the rate of movement of the slab and the rate of movement of the arcs being preselected with respect to each other whereby substantially every point on the one slab surface has an arc spot of an arc of substantially constant arc power and of substantially uniform dwell time thereon as the slab moves in a linear path with resulting increased heating efficiency and more uniform heating of the slab to a constant depth beneath the surface, the fluid cooled arcing surfaces of the electrodes resulting in a reduction of material sublimated from the surface by arc action thereby reducing contamination of the material of the slab.

2. In apparatus for removing defects from a slab of metal, in combination, means for moving the slab at a predetermined speed in a predetermined linear path, first electrode means mounted at a first fixed position along said path, the first electrode means including at least one upper and at least one lower electrode, the slab moving between the upper and lower electrodes, electrical circuit means connected to said upper and lower electrodes and to the slab for producing substantially continuous arcs from the electrodes to the slab, the arcs extending in directions substantially parallel to the axes of the electrodes, each of the upper and lower electrodes including means forming a fluid cooled arcing surface of substantial area with the arcing surface generally parallel to and spaced from the adjacent slab surface and a magnetic field coil in the electrode for generating a magnetic field with at least a strong component extending substantially radially in a transverse direction across the arcing surface in substantially uniform strength around the entire periphery thereof and exerting a force on the arc for substantially continuously moving the arc from the arcing surface in a repetitive path over the arcing surface of the electrode and the adjacent surface of the slab, the first electrode means being so dimensioned with respect to the width of the top and bottom of the slab and the speed of arc movement being so great compared to the speed of slab movement that the arcs periodically traverse the entire width of the slab on the top and bottom thereof at a speed of at least 40 traverses per linear inch of movement of the slab, the arc power being substantially constant and the dwell time of the arc spot at any site on a surface of the slab being substantially uniform whereby heating efficiency is improved and uniform heating of the slab area is obtained, second electrode means including at least a first electrode mounted in fixed position on one side of the slab and at least a second electrode mounted in fixed position on the other side of the slab, the slab moving between the first and second electrodes of the second electrode means, electric circuit means connected to the first and second electrodes and to the slab for producing substantially continuous arcs from the first and second electrodes to the two sides of the slab respectively, the arcs extending in directions generally parallel to the axes of the electrodes respectively, each of the first and second electrodes of the second electrode means including means forming a fluid cooled arcing surface of the substantial area with the arcing surface generally parallel to and spaced from the adjacent slab surface and a magnetic field coil in the electrode for generating a magnetic field with at least a strong component extending substantially radially in a transverse direction across the arcing surface in substantially uniform strength around the entire periphery thereof and exerting a force on the arc for moving the arc substantially continuously in repetitive paths over the arcing surfaces of the first and second electrodes and respective adjacent surfaces of the slab, the first and second electrodes of the second electrode means being so dimensioned with respect to the height of the sides of the slab and the speed of arc movement being so great compared to the speed of slab movement that the arcs from the electrodes traverse substantially the entire heights of the sides of the slab at a rate of at least 40 traverses per linear inch of movement of the slab, the arc power being substantially constant and the dwell time of the arc spot at any site on a surface of the slab being substantially uniform whereby heating efficiency is improved and uniform heating of the slab area is obtained.

3. In apparatus for removing defects from a slab of metal having at least one substantially flat surface, means for moving the slab in a predetermined linear path at a predetermined speed, electrode means including at least one electrode mounted at a predetermined fixed position along said path and including a fluid cooled annular electrode face member forming an arcing surface of substantial area spaced from and substantially parallel to the adjacent flat surface of the slab, electric circuit means for causing the electrode means and slab to be at opposite polarity with respect to each other whereby at least one arc from the annular electrode face member to the flat slab surface is produced, said arc extending in a direction substantially parallel to the axis of the electrode, the electrode means including magnetic field generating means therein for generating a magnetic field with at least a strong component extending substantially radially in a transverse direction across the arcing surface in substantially uniform strength around the entire periphery thereof and exerting a force on the arc for causing any arc between the electrode face member and the slab surface to move in a substantially annular repetitive path on the arcing surface of the electrode face member and to take similar repetitive arc paths on the slab surface as the slab moves, which last named paths extend transversely across the entire slab surface, the speed of arc movement being so great with respect to the speed of slab movement that adjacent paths of an arc spot on the slab surface formed by any two sequential movements of the arc in the arc path thereon leave no substantial area of the slab surface therebetween and an arc spot by an arc of substantially constant power and of substantially uniform dwell time hits substantially every point on the slab surface providing uniform heating of the slab and increased heating efficiency, arc radiation falling upon at least a substantial portion of the slab surface and assisting in heating the slab to the desired temperature and desired depth.

4. Apparatus for removing defects from a slab of metal comprising, in combination, driven roller means adapted to have a slab of metal disposed thereon, the roller means being constructed and arranged to move the slab in a predetermined linear path at a predetermined speed, a first electrode assembly mounted at a first fixed position adjacent the path of movement of the slab and including upper and lower electrodes, electrical circuit means for bringing potentials to the upper and lower electrodes and the slab and causing arcs between the upper electrode and the slab and between the lower electrode and the slab, the upper and lower electrodes each including means forming a fluid cooled arcing surface of substantial area and a magnetic field coil in the electrode for producing a force on the arc whereby the arc from the arcing surface thereof moves substantially continuously at a substantially uniform speed over the arcing surface and the arc spot moves over the surface of the slab in substantially repetitive paths displaced from each other only by the linear movement of the slab, the arcing surface of the electrodes being spaced from and substantially parallel to the adjacent surfaces of the slab, the power of the arc being substantially constant and the dwell time of the arc spot at any site on the slab surface being substantially uniform, the dimensions of the upper and lower electrodes being so chosen that an arc moving over the arcing surface thereof travels the entire distance across the top and bottom of the slab, the rate of movement of the arcs being so great compared to the rate of slab movement that substantially the entire surfaces of the slab are traversed by the arcs as the slab moves with respect to the electrodes, upper and lower gas inlet means for the upper and lower electrodes respectively for bringing an inert gas and releasing the gas adjacent the top and bottom surfaces of the slab in the areas where the arcs thereto occur, a second electrode assembly mounted at an additional fixed position along the path of movement of the slab, the second electrode assembly including third and fourth electrodes disposed adjacent the two sides of the slab respectively, electrical circuit means for bringing potentials to the third and fourth electrodes and the slab for causing arcs from the arcing surfaces of the third and fourth electrodes to the sides of the slab respectively, the third and fourth electrodes each including means forming a fluid cooled arcing surface of substantial area spaced from the adjacent surface of the slab and substantially parallel thereto and a field coil in the electrode for producing a force on the arc whereby the arc from the arcing surface of the electrode moves substantially continuously at a substantially uniform speed over the arcing surface and the arc spot moves over the adjacent surface of the slab in substantially repetitive paths displaced from each other only by the linear movement of the slab, the arcing surfaces of the electrodes being spaced from and substantially parallel to the adjacent surfaces of the slab, the power of the arc being substantially constant and the dwell time of the arc spot at any site on the slab surface being substantially uniform, the third and fourth electrodes being of such dimensions that arcs moving across the arcing surfaces thereof traverse substantially the entire height of both sides of the slab, the rate of movement of the last named arcs being so great compared to the rate of slab movement that substantially the entire adjacent surfaces of the slab are traversed by the arcs as the slab moves with respect to the electrodes, first and second other gas inlet means for bringing an inert gas to the sides of the slab and releasing the inert gas adjacent that portion of the surface of the slab which is being heated by arcs from the third and fourth electrodes, fluid spray means disposed adjacent the third and fourth electrodes for spraying a cooling fluid on successive portions of the sides of the slab after said side portions have passed through the arcs from the third and fourth electrodes, and other fluid spray means disposed adjacent the upper and lower electrodes for spraying a cooling fluid on portions of the top and bottom of the slab after said last-named portions have been heated by the arcs from the upper and lower electrodes.

5. In apparatus for removing defects from a moving slab of metal generally rectangular in cross section, in combination, a plurality of electrodes disposed at predetermined positions along the path of travel of the slab and having arcs therefrom to the adjacent surfaces of the slab respectively, the arcs extending generally parallel to the axes of the electrodes, each of the electrodes including electrode face means forming a fluid cooled arcing surface spaced from and generally parallel to an adjacent surface of the slab and magnetic field coil means in the electrode for generating a magnetic field with at least a strong component extending substantially radially in a transverse direction across the arcing surface in substantially uniform strength around the entire periphery thereof and exerting a force on the arc for causing the arc therefrom to move therearound in substantially annular repetitive paths and causing the arc spot on the slab to take similar paths, the power in the arc remaining substantially constant as it moves and the dwell time of the arc spot being substantially uniform at every arc spot site on the slab surface whereby uniform heating with increased heating efficiency are attained, the plurality of electrodes being so constructed and arranged that substantially the entire slab surface including the top and bottom of the slab and the two sides thereof are traversed by at least one arc as the slab moves along the path and without shifting the positions of any of the electrodes.

6. Apparatus according to claim 5 including in addition a plurality of gas means disposed adjacent the plurality of electrodes respectively for bringing an inert gas to the surfaces of the slab and releasing the gas adjacent the portions of the surface as said last-named portions are heated by the arcs from the plurality of electrodes.

7. Apparatus for removing defects from a multisurface moving slab of metal as said slab of metal moves along a predetermined linear path comprising, in combination, a plurality of electrode means equal to the number of slab surfaces mounted at predetermined fixed positions along the path of travel of the slab and adapted to be connected to electric circuit means to produce electric arcs to all the surfaces of the slab, each of the electrode means including at least one-non-consumable electrode including a fluid cooled arcing surface of substantial area spaced from and substantially parallel to an adjacent slab surface whereby an arc of substantially uniform length and of substantially constant power is produced, the electrode including magnetic field producing means for causing any arc to move substantially continuously around an arcing surface and causing the arc spot to move substantially continuously over the adjacent surface of the slab in substantially repetitive paths displaced from each other only by the linear movement of the slab with the dwell time of the arc spot at any site on the slab surface being substantially uniform, all of the electrode means being so dimensioned that the entire lateral distance across the adjacent slab surface is covered by an arc path produced by at least one arc, the slab moving at such a sufficiently slow speed and the speed of movement of the arcs being so great that substantially every area of all the surfaces of the slab are substantially directly heated by arcs from the plurality of electrode means.

8. Apparatus according to claim 7 including in addition a plurality of fluid spray means disposed adjacent the plurality of electrode means respectively for spraying and cooling portions of the surface of the slab after said last named portions have moved past the arcing areas.

9. Apparatus according to claim 7 including in addition driven roller means for moving the slab along said path.

10. Apparatus for removing defects from a slab or bloom of metal comprising, in combination, means for moving the slab along a predetermined linear path of travel, an upper electrode assembly mounted in a fixed position adjacent the upper surface of the slab at a predetermined position along the path of travel thereof, a lower electrode assembly mounted in a fixed position adjacent the bottom of the slab at a corresponding position along the path of travel thereof, each of the upper and lower electrode assemblies including a plurality of spaced non-consumable electrodes, each of the non-consumable electrodes including means forming a fluid cooled arcing surface spaced from the adjacent surface of the slab and substantially parallel thereto whereby an arc of substantially uniform length and substantially constant power may extent between arcing surface and slab surface, at least the electrodes being adapted to be connected in an electrical circuit for producing arcs from all of the electrodes to the slab, magnetic field coil means in each electrode for moving the arc from the arcing surface thereof along repetitive paths on the surface of the slab, the arcing surfaces of the plurality of electrodes of the upper electrode assembly overlapping each other along the width of the top of the slab whereby every portion of the top of the slab is substantially traversed by an arc spot of substantially uniform dwell time by an arc from at least one of said plurality of non-consumable electrodes, the plurality of spaced non-consumable electrodes of the lower electrode assembly having arcing surfaces which overlap each other along the width of the bottom of the slab whereby every portion of the bottom of the slab is substantially traversed by at least one arc as the slab moves along said path, upper and lower spray means disposed adjacent the upper and lower electrode assemblies for spraying the top and bottom portions of the slab after said top and bottom portions have passed adjacent the electrodes of the upper and lower electrode assemblies and rapidly cooling the same, first and second side electrode assemblies mounted at predetermined fixed positions along the path of travel of the slab, each of the side electrode assemblies including at least a pair of non-consumable electrodes, all of the electrodes of the first and second side electrode assemblies being adapted to be connected in electrical circuit means for producing arcs from the electrodes to the sides of the slab, each of the last named electrodes including means forming a fluid cooled arcing surface spaced from and substantially parallel to the adjacent surface of the slab whereby an arc of substantially uniform length and substantially constant power extends between arcing surface and slab surface, a field coil in each electrode for moving the arc therefrom along repetitive paths on the surface of the slab, each pair of electrodes producing laterally overlapping arc paths on the slab surfaces so that the arcs from the electrodes of each pair of electrodes substantially traverse all points on the side of the slab as the side of the slab passes thereby; and first and second spray means disposed adjacent the first and second side electrode assemblies for spraying a cooling fluid on portion of the two sides of the slab after said last named portions have moved past and through the arcs from the first and second side electrode assemblies to the slab.

11. Apparatus according to claim 10 including in addition means for bringing an inerst gas to the electrodes of the upper and lower electrode assemblies, and means for bringing an inert gas to the electrodes of the first and second side electrode assemblies.

12. Apparatus for heat treating a slab of metal adapted to undergo translatory motion in two directions along a predetermined path of travel comprising, in combination, reversible slab moving means, first electrode means mounted in fixed position adjacent the path of travel whereby at least one arc is produced from the first electrode means to one of the upper and lower surfaces of the slab as the slab moves in one direction, the first electrode means including means forming a fluid cooled arcing surface of substantial area spaced from and substantially parallel to the slab surface, an arc between slab surface and arcing surface being of substantially constant length and of substantially constant power, the electrode means including magnetic field means for moving the arc in a substantially repetitive path over the adjacent surface of the slab whereby substantially all areas of said surface are heated by the arc therefrom, second electrode means mounted at a second fixed position along the path of travel of the slab whereby at least one arc from the second electrode means takes place to one side of the slab as the slab moves in said one direction, the second electrode means including means forming a fluid cooled arcing surface of substantial area spaced from and substantially parallel to the adjacent slab surface, an arc between slab surface and arcing surface being of substantially constant length and of substantially constant power, the electrode means including magnetic field means for moving the arc in a substantially repetitive path over the adjacent surface of the slab whereby substantially all areas of said side surface are heated by the arc therefrom, means for turning the slab over, the slab turning means being located at a predetermined other position along the path of travel of the slab, the slab being thereafter moved in a reverse direction past the first and second electrode means whereby the other surface of the top and bottom surfaces and the other side of the two side surfaces have arcs thereto.

13. Apparatus according to claim 12 including in addition first and second fluid spray means adapted to be individually controlled disposed one on each side of the first electrode means, the first and second spray means being selectively turned on in accordance with the direction of movement of the slab to cool selected portions of the top and bottom surface of the slab after said portions have passed adjacent the arc from the first electrode means, and third and fourth spray means disposed one on each side of the second electrode means and adapted to be individually controlled in accordance with the direction of movement of the slab for spraying and cooling selected portions of the two sides of the slab after said selected portions have passed adjacent the arc from the second electrode means.

14. Apparatus according to claim 12 including in addition for bringing an inert gas to the arcing surface of the first electrode means and releasing the inert gas adjacent the surface of the slab which is being heated, and other means for bringing an inert gas to the arcing surface of the second electrode means and releasing the inert gas adjacent that side of the slab which is being heated.

15. In apparatus for removing defects from a slab of metal having at least one flat surface, in combination, means for moving the slab in a predetermined path at a predetermined speed, electrode means including at least one electrode mounted at a predetermined fixed position along said path, and electric circuit means interconnecting the electrode means and the slab for producing at least one arc from the electrode means to said flat surface of the slab, the electrode means having a fluid cooled electrode face member forming an arcing surface spaced from and substantially parallel to said flat surface of the slab, the electrode means including magnetic field coil means therein for generating a magnetic field with at least a strong component extending substantially radially in a transverse direction across the arcing surface in substantially uniform strength around the entire periphery thereof and exerting a force on the arc for causing any arc to move over an arcing surface substantially continuously in a substantially repetitious path and thereby move an arc spot on said last named slab surface in a similar path, the electrode means being so dimensioned with respect to the lateral dimension of the flat slab surface that an arc spot of substantially uniform dwell time traverses substantially the entire last-named surface, the parallel arrangement of the arcing surface and the slab surface insuring that the arc length remains substantially unchanged as it moves thereby maintaining substantially constant arc power and uniform heating of the slab, radiation from the arc as it moves in said repetitious path falling on the slab and assisting in heating the slab.

(References on following page)

References Cited

UNITED STATES PATENTS

| | | | |
|---|---|---|---|
| 1,958,649 | 5/1934 | Stine | 219—137 |
| 2,008,846 | 7/1935 | Zack | 219—74 |
| 2,125,172 | 7/1938 | Kinzel | 219—121 |
| 2,286,210 | 6/1942 | Klemperer et al. | 219—100 |
| 2,472,851 | 6/1949 | Landis et al. | 219—123 |
| 3,050,616 | 8/1962 | Gage | 219—69 |
| 3,059,099 | 10/1962 | Carpenter et al. | 219—137 |
| 3,102,946 | 9/1963 | Fonberg | 219—123 |
| 3,146,336 | 8/1964 | Whitacre | 219—121 |
| 3,211,886 | 10/1965 | Barkan et al. | 219—121 |
| 3,248,514 | 4/1966 | Ramsey | 219—123 |
| 3,336,460 | 8/1967 | Hauck et al. | 219—131 |

JOSEPH V. TRUHE, Primary Examiner

U.S. Cl. X.R.

219—69, 123